US011517851B2

(12) United States Patent
Wright et al.

(10) Patent No.: US 11,517,851 B2
(45) Date of Patent: Dec. 6, 2022

(54) AIR DRYER WITH PREFILTRATION STAGE BYPASS

(71) Applicant: NEW YORK AIR BRAKE, LLC, Watertown, NY (US)

(72) Inventors: Eric C. Wright, Evans Mills, NY (US); Derick Call, Evans Mills, NY (US)

(73) Assignee: NEW YORK AIR BRAKE, LLC, Watertown, NY (US)

(*) Notice: Subject to any disclaimer, the term of this patent is extended or adjusted under 35 U.S.C. 154(b) by 408 days.

(21) Appl. No.: 16/540,157

(22) Filed: Aug. 14, 2019

(65) Prior Publication Data

US 2021/0046419 A1 Feb. 18, 2021

(51) Int. Cl.
| B01D 53/02 | (2006.01) |
| B01D 53/26 | (2006.01) |
| B01D 46/00 | (2022.01) |

(52) U.S. Cl.
CPC ......... B01D 53/261 (2013.01); B01D 46/003 (2013.01)

(58) Field of Classification Search
CPC ...... B01D 2259/402; B01D 2259/4566; B01D 46/003; B01D 53/0454; B01D 53/261; B60T 17/002; B60T 17/004; B60T 17/221; F15B 2211/411; F15B 2211/41563; F15B 2211/41581; F15B 2211/426; F15B 2211/6343; F15B 2211/865; F15B 2211/8757; F15B 2211/8855
See application file for complete search history.

(56) References Cited

U.S. PATENT DOCUMENTS

| 3,225,517 A | | 12/1965 | Wachsmuth | |
| 3,864,102 A | * | 2/1975 | Powers | F17D 3/14 |
| | | | | 95/39 |
| 5,286,283 A | * | 2/1994 | Goodell | B60T 17/004 |
| | | | | 96/113 |

(Continued)

FOREIGN PATENT DOCUMENTS

| EP | 2141055 A2 | 1/2010 |
| JP | S58210824 A | 12/1983 |

(Continued)

OTHER PUBLICATIONS

International Search Report and Written Opinion Form PCT/ISA/210 and PCT/ISA237, International Application No. PCT/US2019/046444, pp. 1-9, International Filing Date Aug. 14, 2019, date of search report dated Jan. 28, 2020.

*Primary Examiner* — Christopher P Jones
(74) *Attorney, Agent, or Firm* — David Nocilly

(57) ABSTRACT

A bypass for an air dryer having an inlet, a prefiltration stage having a drain valve to purge contaminants, a pair of inlet valves in communication with the prefiltration stage to control the flow of compressed air through the desiccant towers, and an outlet coupled to the pair of desiccant towers. The bypass may be a bypass valve that is normally open to the outlet when the air dryer is unpowered and pilotable to be a closed to allow air to flow to the prefiltration stage when the air dryer is powered. The bypass may be a three-way valve that is normally coupled to the outlet and that may be piloted to connect to the prefiltration stage when the dryer is powered. The bypass may also be a check valve that opens in response to pressure in the inlet to allow compressed air to flow directly to the outlet.

14 Claims, 4 Drawing Sheets

(56) References Cited

U.S. PATENT DOCUMENTS

| | | | | |
|---|---|---|---|---|
| 5,647,891 A | * | 7/1997 | Blizzard | B01D 53/047 95/105 |
| 6,126,724 A | * | 10/2000 | Martin | B01D 46/0087 95/52 |
| 6,319,296 B1 | * | 11/2001 | Fornof | B01D 46/0012 55/313 |
| 7,279,026 B1 | * | 10/2007 | Fresch | B01D 53/04 95/124 |
| 2013/0145779 A1 | * | 6/2013 | Hwang | F24F 3/1411 62/94 |
| 2015/0165370 A1 | * | 6/2015 | Peake | B01D 53/268 96/7 |
| 2018/0297572 A1 | * | 10/2018 | Reifinger | B60T 17/004 |

FOREIGN PATENT DOCUMENTS

| | | |
|---|---|---|
| WO | 0112488 A1 | 2/2001 |
| WO | 2004103509 A2 | 12/2004 |

* cited by examiner

AIR DRYER WITH PREFILTRATION STAGE BYPASS

BACKGROUND OF THE INVENTION

1. Field of the Invention

The present invention relates to air dryers for locomotive air supply systems and, more specifically, to an air dryer having a prefiltration stage bypass that is operational when the air dryer is unpowered.

2. Description of the Related Art

A pressure swing air dryer for a locomotive air supply system, such as that disclosed in U.S. Pat. No. 10,150,077, includes a prefiltration stage having a water separator and coalescing filters and a desiccant stage having two drying towers. The dryer also includes controls to periodically vent the accumulated condensate from the prefiltration stage and controls to periodically regenerate the saturated desiccant by switching between the two towers. In a dryer such as this, the inlet valves are normally open and the exhaust valves are normally closed, so the dryer does not block air flow in the event of a power loss to the dryer.

During periodic maintenance of the locomotive, service personnel may turn off the electrical power supply of the air dryer to prevent an unexpected drain valve or purge actuation. In some instances, the service personnel may forget to re-establish power to the air dryer when the locomotive is placed back into service such that the dryer is subjected to an extended amount of air flow in an unpowered state. When the air dryer is unpowered but subjected to air flow, a significant amount of water and/or oil condensate will accumulate in the air dryer because the prefiltration is passive and does not require power for the water separator and coalescing filters to remove liquid phase water and oil from the air stream. However, power is required for operation of the prefiltration drain valve to discharge the accumulated condensate. As a result, the accumulated condensate will ultimately flood the desiccant and permanently damage the air dryer.

Unfortunately, it is not possible to have the prefiltration drain valve be normally open, instead of normally closed, so that it will vent continuously when the power is off. In cold weather, for example, a parked locomotive may employ automatic engine stop start (AESS) mode to prevent locomotive freezing and to minimize unnecessary idling of the diesel. When a locomotive is in AESS mode, the AESS system will automatically start the locomotive diesel engine to warm the coolant and to operate the locomotive air compressor to recharge the main reservoir if the engine coolant temperature or main reservoir pressure drops below predetermined threshold values. In AESS mode, the air dryer is powered off because periodic venting of the drain valve and purging of the desiccant will deplete the main reservoir pressure and cause unnecessary restarting of the locomotive diesel engine so that the locomotive air compressor can recharge the main reservoir. As a result, if the prefiltration drain valve were configured to be normally open, it will deplete main reservoir pressure and cause AESS operation when such operation is not warranted. Thus, there is a need in the art for an approach that can protect an unpowered air dryer from the consequences of an extended amount of air flow without using a normally open prefiltration stage drain valve.

BRIEF SUMMARY OF THE INVENTION

The present invention comprises a bypass that can protect against an undesired and potentially damaging accumulation of contaminants extracted by the prefiltration stage of an air dryer when the air dryer is unpowered. More specifically, the present invention includes an air dryer having an inlet for receiving compressed air, a prefiltration stage in communication with the inlet and having a drain valve to purge contaminants extracted by the prefiltration stage from the compressed air, a pair of inlet valves in communication with the prefiltration stage to control the flow of compressed air from the prefiltration stage to a corresponding pair of desiccant towers, and an outlet coupled to the pair of desiccant towers. A bypass selectively couples the inlet to the outlet so that the compressed air can flow directly from the inlet to the outlet without passing through the prefiltration stage when the air dryer is unpowered. When the air dryer is powered, the bypass disconnects the inlet from the outlet and allows the compressed air to flow through the air dryer in the normal fashion.

In one embodiment, the bypass comprises a bypass valve that is moveable between a first position where the inlet is placed in communication with the outlet and a second position where the inlet is isolated from the outlet. The bypass valve is biased to be in the first position when the air dryer is unpowered. The pair of inlet valves are configured to be closed when the air dryer is unpowered. The bypass includes a pilot that can drive the bypass valve into the second position when the air dryer is powered.

In another embodiment, the bypass comprises a three-way valve that is moveable between a first position where the inlet is placed in communication with the outlet and a second position where the inlet is placed in communication with the prefiltration stage. The three-way valve is biased into the first position so that bypass valve is in the first position when the air dryer is unpowered. The bypass includes a pilot that can drive the three-way valve into the second position when the air dryer is powered to connect the inlet with the prefiltration stage.

In a further embodiment, the bypass comprises a check valve that will open in response to a predetermined amount of pressure at the inlet to allow compressed air to flow from the inlet to the outlet. The pair of inlet valves are configured to be closed when the air dryer is unpowered so that the pressure from the compressed air will open the check valve, thereby allowing the compressed air to flow directly to the outlet rather than through the prefiltration stage. When the air dryer is powered, the inlet valves open thereby reducing the pressure at the inlet until the check valve closes.

The present invention also comprises a method of preventing damage to an air dryer having an inlet for receiving compressed air, a prefiltration stage in communication with the inlet and having a drain valve to purge contaminants extracted by the prefiltration stage from the compressed air, a pair of inlet valves in communication with the prefiltration stage to control the flow of compressed air from the prefiltration stage to a corresponding pair of desiccant towers, and an outlet coupled to the pair of desiccant towers. In a first step, the method comprises opening a bypass between the inlet to the outlet when the air dryer is unpowered so that the compressed air flows directly from the inlet to the outlet without passing through the prefiltration stage. In another step, the method comprises closing the bypass when the air dryer is powered so that the compressed air flows through the prefiltration stage. The bypass may comprise a bypass valve with the step of opening a bypass comprising biasing the bypass valve into a first position where the inlet is placed in communication with the outlet when the air dryer is unpowered and the step of closing the bypass comprising piloting the bypass valve into a second position where the inlet is isolated from the outlet. The bypass may also comprise a three-way valve with the step of opening a bypass comprising biasing the three-way valve into a first position where the inlet is placed in communication with the outlet and the step of closing the bypass comprising piloting the three-way valve into a second position where the inlet is placed in communication with the prefiltration stage. The bypass may additionally comprise a check valve with the step of opening the bypass comprising allowing a predetermined amount of pressure of the compressed air to open the check valve and the step of closing the bypass comprising opening at least one of the inlet valves.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
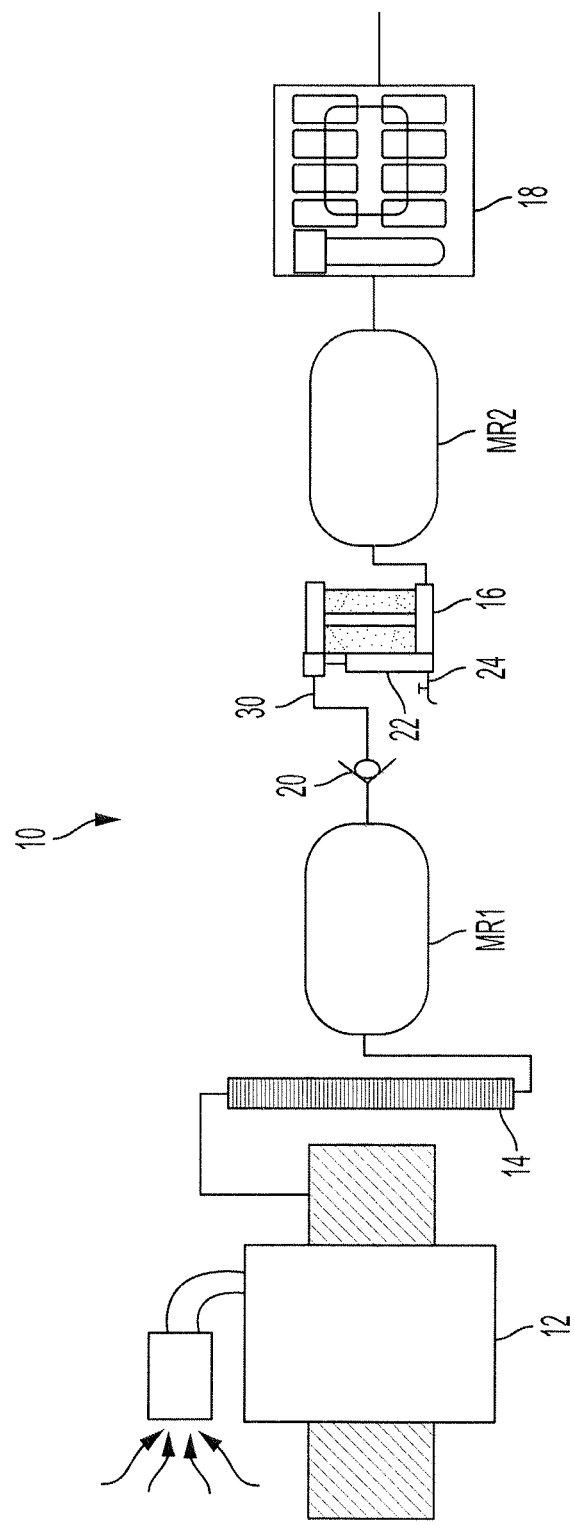
FIG. 1 is a schematic of a locomotive air supply system having an unpowered air dryer bypass system according to the present invention.

Referring to the figures, wherein like numeral refer to like parts throughout, there is seen in FIG. 1 a locomotive air system 10 having an air compressor 12, an aftercooler 14, first and second main reservoirs MR1 and MR2, and a two-tower desiccant air dryer 16 having a prefiltration stage bypass when the air dryer is unpowered according to the present invention, as more fully described below. Second main reservoir MR2 is coupled to the braking system 18 and a check valve 20 is positioned between the first and second main reservoirs MR1 and MR2. A prefiltration stage 22 is associated with air dryer 16 and includes a drain valve 24 that is operated according to a drain valve purge cycle time.

Figure 2:
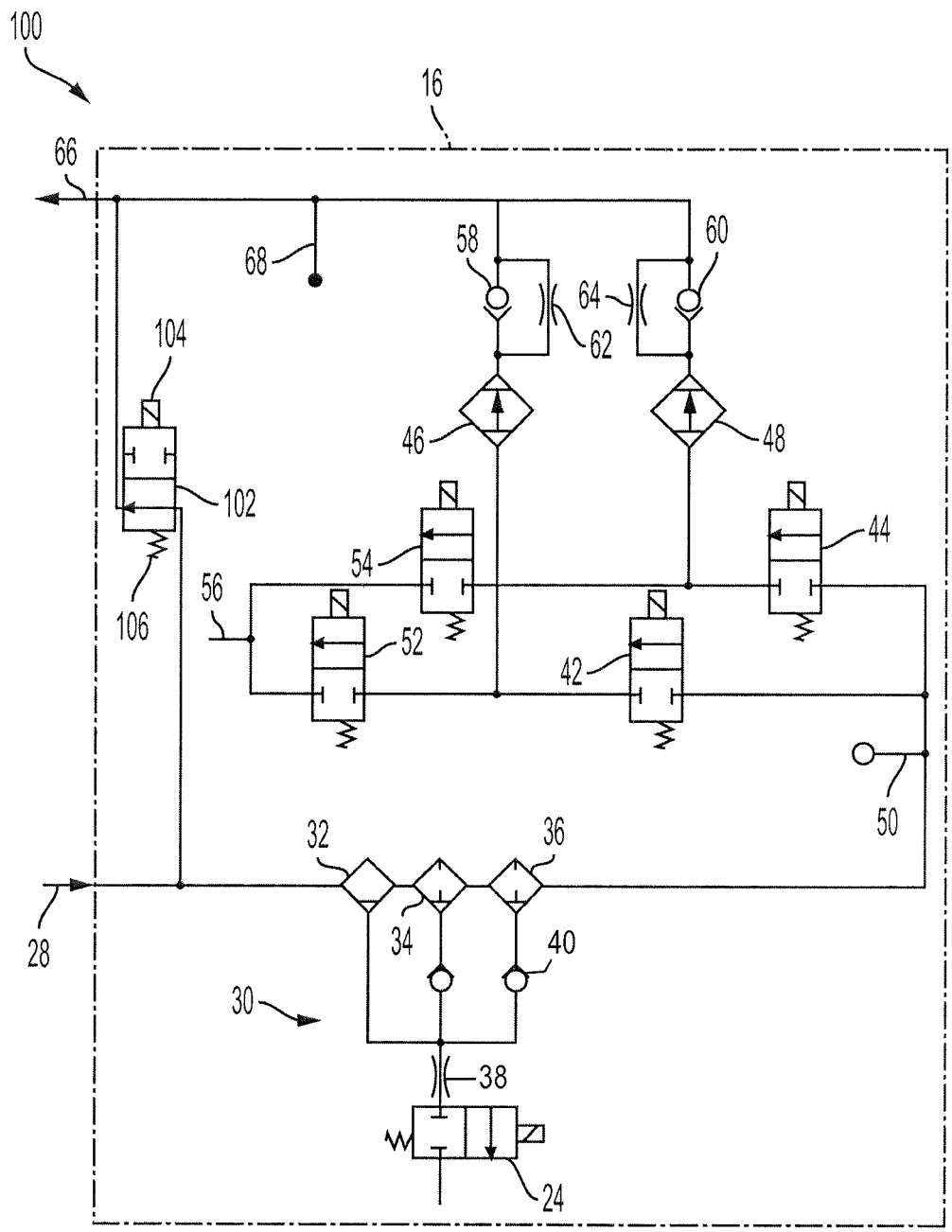
FIG. 2 is a schematic of a first embodiment of an unpowered air dryer bypass system according to the present invention.

Referring to FIG. 2, two-tower desiccant air dryer 16 comprises an inlet 28 for receiving compressed air from first main reservoir MR1. Inlet 28 is in communication with prefiltration stage 30, shown as comprising a water separator 32, a coarse coalescer 34, and a fine coalescer 36, that can remove contaminants, such as particulates and liquid phase water and oil, from the incoming air. Any accumulated liquids in water separator 32, coarse coalescer 34, and fine coalescer 36 are expelled through drain valve 24. Water separator 32, coarse coalescer 34, and fine coalescer 36 may be coupled to drain valve 24 via a choke 38 to limit the rate of expulsion of air. A check valve 40 may be positioned in line with both coarse coalescer 34 and fine coalesce 36. A pair of inlet valves 42 and 44 are positioned downstream of prefiltration stage 30 for diverting incoming air between one of two pathways, each of which is associated with one of two desiccant towers 46 and 48. A temperature sensor 50 may be positioned upstream of inlet valves 42 and 44 and downstream of prefiltration stage 30. The first pathway downstream of first inlet valve 42 leads to an exhaust valve 52 and first desiccant tower 46. The second pathway downstream of second inlet valve 44 leads to a second exhaust valve 54 and second desiccant tower 48. The first pathway further includes a first check valve 58 and first bypass orifice 62 downstream of first desiccant tower 46. The second pathway further includes a second check valve 60 and bypass orifice 64 downstream of second desiccant tower 48. A single outlet 66 is coupled to the end of the first and second pathways, and a humidity sensor 68 may be positioned upstream of outlet 66. Inlet valves 42 and 44 and exhaust valves 52 and 54 are individually and selectively operated so that compressed air provided at inlet 28 is directed through one of desiccant towers 46 or 48 for drying. The other of desiccant towers 46 or 48 may be regenerated by allowing dried air to reflow through bypass orifice 62 or 64 and through exhaust valve 52 or 54 to an exhaust 56 as needed.

As seen in FIG. 2, a first embodiment of an unpowered air dryer bypass 100 comprises a bypass valve 102 having a pilot 104 that is positioned inline between inlet 28 and outlet 66. Bypass valve 102 is biased by a spring 106 into a first position where inlet 28 is in communication with outlet 66 and is thus normally open when air dryer 16 is unpowered. Inlet valves 42 and 44 are configured to be normally closed, such as by biasing them into a closed position unless affirmatively piloted into the open position when air dryer 16 is powered, and are therefore closed when air dryer 16 is unpowered. As a result, when air dryer 16 is unpowered, any compressed air flow at inlet 28 will not flow through prefiltration stage 30 and will instead flow directly to outlet 66. Thus, in an unpowered state, there is no compressed air flow through prefiltration stage 30 and no accumulation of condensate from the water separator or coalescing filters that can overflow and damage the desiccant in desiccant towers 46 and 48. When air dryer 16 is powered, however, pilot 104 is activated to move bypass valve 102 against the bias of spring 106 into a second position where communication between inlet 28 and outlet 66 is closed. Powering of air dryer 16 also opens inlet valves 42 and 44, so air dryer 16 can function in the normal fashion with periodic switching of the compressed air flow through one or the other of desiccant towers 46 and 48 to provide dry air to outlet 66 and back flowing of a fraction of dry air from outlet 66 through the other (saturated) of desiccant towers 46 and 48 to exhaust 56 to regenerate the desiccant in the saturated tower.

Figure 3:
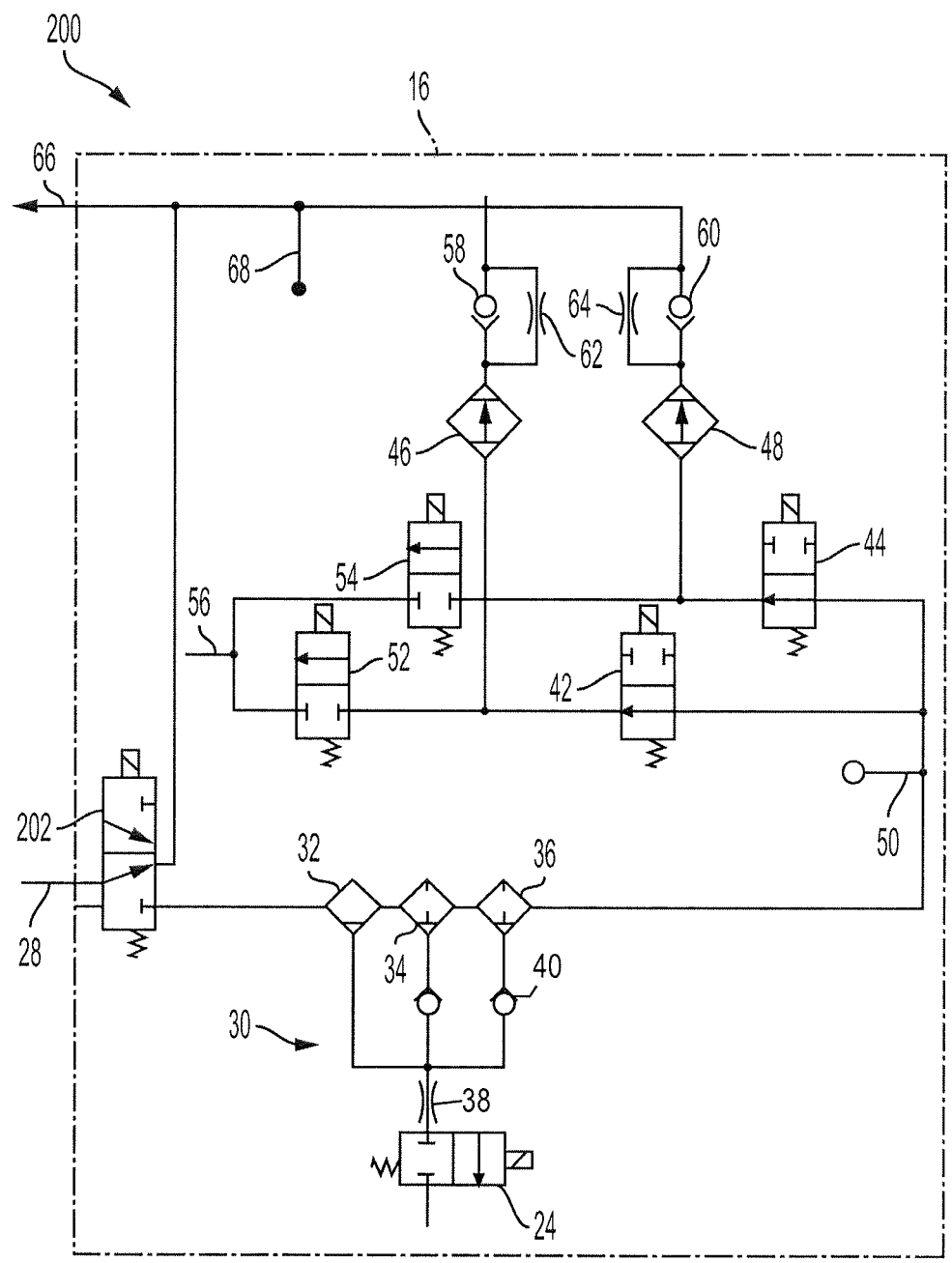
FIG. 3 is a schematic of a second embodiment of an unpowered air dryer bypass system according to the present invention.

Referring to FIG. 3, a second embodiment of an unpowered air dryer bypass 200 comprises a three-way valve 202 having a pilot 204 that is positioned to selectively couple inlet 28 to outlet 66 in a first position or couple inlet 28 to prefiltration stage 30 in a second position. Three-way valve 202 is biased by a spring 206 to be normally open, and therefore connects inlet 28 to outlet 66 when air dryer 16 is unpowered. In this embodiment, inlet valves 42 and 44 may be configured to be normally closed or normally open as the flow of compressed air to prefiltration stage is dependent on whether three-way valve 202 is in the first position or the second position. When air dryer 16 is powered, three-way valve 202 is piloted into the second position so that air dryer 16 can function in the normal fashion.

Figure 4:
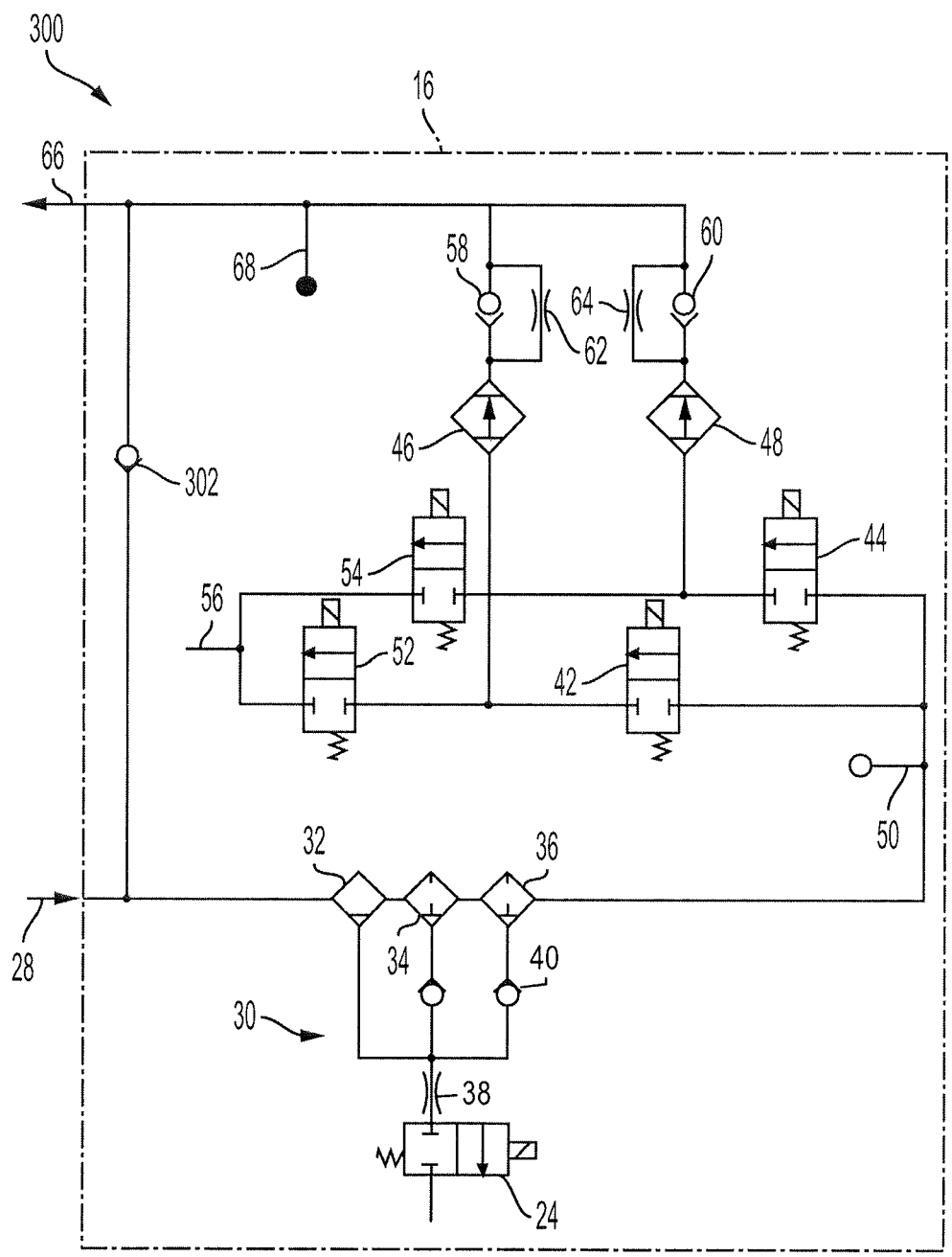
FIG. 4 is a schematic of a third embodiment of an unpowered air dryer bypass system according to the present invention.

Referring to FIG. 4, a third embodiment of an unpowered air dryer bypass 100 comprises a check valve 302 that is positioned inline between inlet 28 and outlet 66. Check valve 302 is biased to be normally closed, and is therefore closed when air dryer 16 is unpowered. Inlet valves 42 and 44 are configured to be normally closed, and are therefore closed when air dryer 16 is unpowered. When air dryer is unpowered, any air flow at inlet 28 will not flow through prefiltration stage 30 because inlet valves 42 and 44 are closed. When the compressed air flow develops sufficient pressure to overcome the bias of check valve 302, check valve 302 opens and allow the air to flow directly to outlet 66, thereby bypassing prefiltration stage 30. When air dryer 16 is powered and one of inlet valve 42 and 44 are opened to allow the flow of compressed air, the pressure of compressed air at check valve 302 will drop until check valve 302 closes and air dryer 16 will function in the normal fashion.

What is claimed is:

1. An air dryer, comprising;
an inlet for receiving a flow of compressed air;
a prefiltration stage in communication with the inlet and having a drain valve to purge contaminants extracted by the prefiltration stage from the flow of compressed air;
a pair of inlet valves in communication with the prefiltration stage to control the flow of compressed air from the prefiltration stage through a pair of desiccant towers, wherein the pair of inlet valves are selectively operable to provide the flow of compressed air through a first pathway associated with one of the pair of desiccant towers and a second pathway associated with the other of the pair of desiccant towers;
an outlet coupled to the first pathway and the second pathway downstream of the pair of desiccant towers; and
a bypass coupling the inlet to the outlet so that the flow of compressed air is from the inlet to the outlet without passing through the prefiltration stage.

2. The air dryer of claim 1, wherein the bypass comprises a bypass valve that is moveable between a first position where the inlet is placed in communication with the outlet and a second position where the inlet is isolated from the outlet.

3. The air dryer of claim 2, wherein the bypass valve is biased into the first position when the air dryer is unpowered.

4. The air dryer of claim 3, wherein the pair of inlet valves are closed when the air dryer is unpowered.

5. The air dryer of claim 4, wherein the bypass includes a pilot that can drive the bypass valve into the second position when the air dryer is powered.

6. The air dryer of claim 1, wherein the bypass comprises a three-way valve that is moveable between a first position where the inlet is placed in communication with the outlet and a second position where the inlet is placed in communication with the prefiltration stage.

7. The air dryer of claim 6, wherein the three-way valve is biased into the first position when the air dryer is unpowered.

8. The air dryer of claim 7, wherein the bypass includes a pilot that can drive the three-way valve into the second position when the air dryer is powered.

9. The air dryer of claim 1, wherein the bypass comprises a check valve that will open in response to a predetermined amount of pressure at the inlet and allow the flow of compressed air to flow from the inlet to the outlet.

10. The air dryer of claim 9, wherein the pair of inlet valves are closed when the air dryer is unpowered.

11. A method of preventing damage to an air dryer having an inlet for receiving compressed air, a prefiltration stage in communication with the inlet and having a drain valve to purge contaminants extracted by the prefiltration stage from the compressed air, a pair of inlet valves in communication with the prefiltration stage to control the flow of compressed air from the prefiltration stage through a first pathway associated with one of a pair of desiccant towers and a second pathway associated with the other of the pair of desiccant towers, and an outlet coupled to the first pathway and the second pathway downstream of the pair of desiccant towers, comprising the steps of:
opening a bypass when the air dryer is unpowered between the inlet to the outlet so that the flow of compressed air is from the inlet to the outlet without passing through the prefiltration stage and the pair of desiccant towers; and
closing the bypass when the air dryer is powered so that the compressed air flows through the prefiltration stage.

12. The method of claim 11, wherein the bypass comprises a bypass valve and the step of opening the bypass comprises biasing the bypass valve into a first position where the inlet is placed in communication with the outlet when the air dryer is unpowered and the step of closing the bypass comprises piloting the bypass valve into a second position where the inlet is isolated from the outlet.

13. The method of claim 11, wherein the bypass comprises a three-way valve and the step of opening the bypass comprises biasing the three-way valve into a first position where the inlet is placed in communication with the outlet and the step of closing the bypass comprises piloting the three-way valve into a second position where the inlet is placed in communication with the prefiltration stage.

14. The method of claim 11, wherein the bypass comprises a check valve and the step of opening the bypass comprises allowing a predetermined amount of pressure of the compressed air to open the check valve and the step of closing the bypass comprises opening at least one of the inlet valves.

* * * * *